United States Patent [19]

Vangsness

[11] 3,862,770
[45] Jan. 28, 1975

[54] METER BAR PROVIDING ACCOMMODATION TO VARIATIONS IN NIPPLE SPACING

[76] Inventor: Gordon A. Vangsness, 10209 Pacific Ave., Villa Park, Ill. 60131

[22] Filed: July 2, 1973

[21] Appl. No.: 375,607

[52] U.S. Cl. .................................. 285/30, 285/286
[51] Int. Cl. ............................................. F16l 35/00
[58] Field of Search ............ 285/30, 130, 286, 132, 285/416, 179, 189; 73/201; 248/68, 317

[56] References Cited
UNITED STATES PATENTS

| | | | |
|---|---|---|---|
| 1,836,481 | 12/1931 | Lutz | 73/201 X |
| 3,506,229 | 4/1970 | McDowell | 248/68 |
| 3,746,371 | 7/1973 | Leopold, Jr. et al. | 285/30 |

Primary Examiner—Richard J. Scanlan, Jr.
Attorney, Agent, or Firm—Wolfe, Hubbard, Leydig, Voit & Osann, Ltd.

[57] ABSTRACT

A meter bar for a gas meter formed of a flat elongated plate of metal bent into U-configuration to form a vertical mounting portion with horizontally spaced, vertical end portions, the end portions having alined openings formed therein and with plumbers' elbows being welded into the openings so as to extend mutually inwardly and downwardly to provide nipple connections precisely spaced to register with the nipples conventionally provided on a gas meter. The openings telescopingly receive the flanges of the respective elbows and are of slightly greater diameter than the flanges for relative shifting movement, as well as relative telescoping movement, for the purpose accurate relative positioning prior to welding permanently in place. The mounting portion is longitudinally embossed for purposes of rigidification. Nonetheless, the plate is of sufficiently thin gauge as to permit slight relative movement between the elbows and slight skewing of the elbows relative to one another as necessary to accommodate nipples which may not be precisely spaced or oriented.

4 Claims, 4 Drawing Figures

PATENTED JAN 28 1975  3,862,770
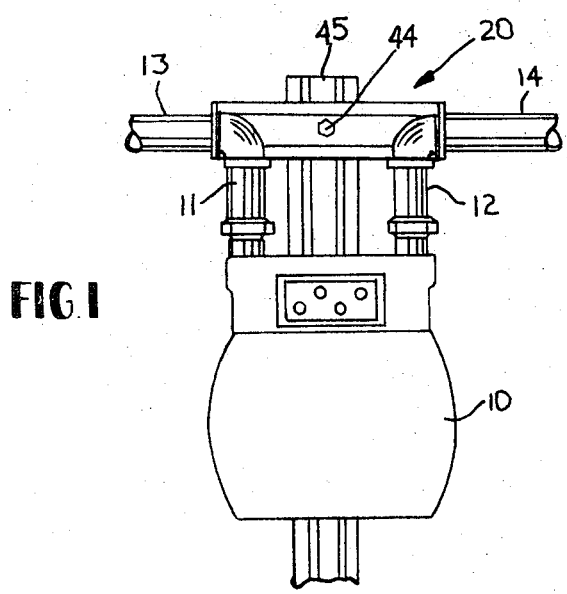
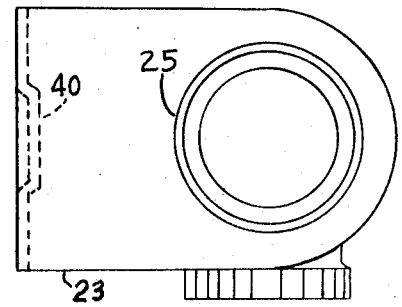
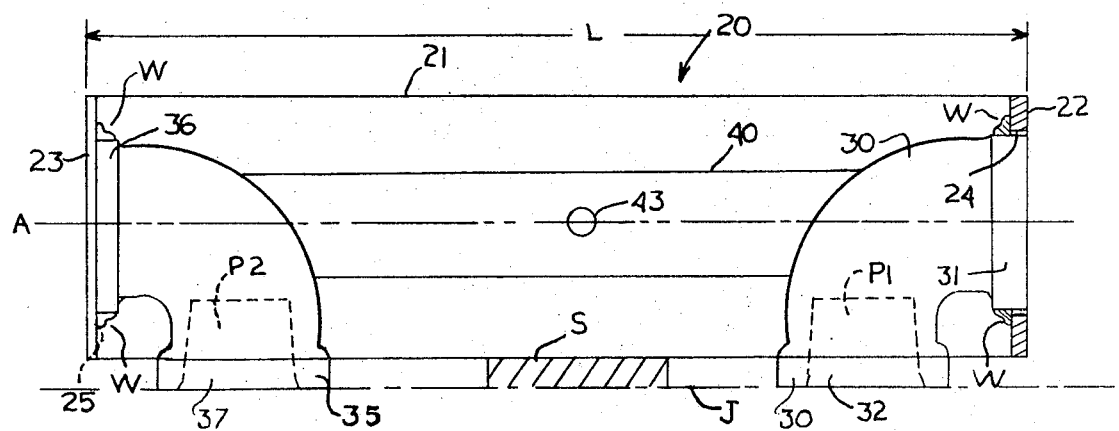
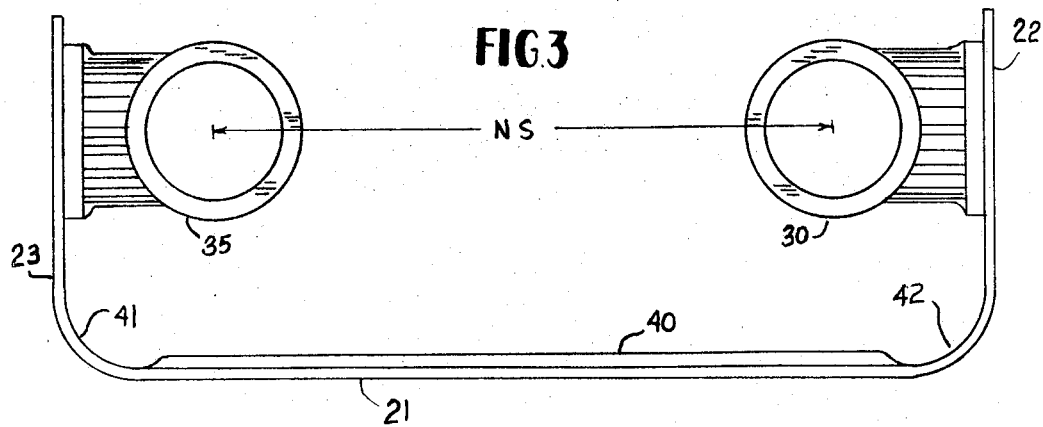

3,862,770

METER BAR PROVIDING ACCOMMODATION TO VARIATIONS IN NIPPLE SPACING

It has been the practice in the plumbing field for many years to mount a domestic gas meter upon a cost iron meter bar. Such meter bars have been relatively expensive and subject to fluctuations in supply, but even more importantly it has not been possible, in such cast iron meter bars, to establish a consistent spacing of the nipple connections, center-to-center, which precisely corresponds to standard nipple spacing. Thus it has been customary to interpose between the meter bar and the meter a pair of relatively expensive offset swivels to accommodate possible misalinement, adding further to the cost.

In my prior application Ser. No. 317,640 filed Dec. 22, 1972 now U.S. Pat. No. 3,814,465 I have disclosed and claimed a composite meter bar consisting of a plate of L-shaped configuration having a pair of openings in which plumbers' elbows are secured by welding in a jig and on precise relative centers.

It is the object of the present invention to provide an improved meter bar which not only overcomes the disadvantages of the cast iron meter bar, providing accurately established spacing of the nipple connections, but which has additional features of flexibility, permitting automatic accommodation to the nipples of a gas meter which are subject to error in spacing or parallelism.

It is a more specific object of the invention to provide a meter bar of composite construction consisting of a U-shaped plate of metal and pair of plumbers' elbows which provides relative shifting movement of the elbows in all of the possible directions to achieve accuracy when the assembly is set up in a welding jig and prior to welding the elements permanently together.

Finally, it is an object to provide a meter bar which is extremely light yet inherently strong, which may be manufactured at minimum cost on a high production basis and which is susceptible to nesting for economical shipment to the place of usage.

Other objects and advantages of the invention will become apparent upon reading the attached detailed description and upon reference to the drawings in which:

FIG. 1 is an elevational view of a meter bar constructed in accordance with the invention supporting a gas meter in operating position.

FIG. 2 is a front view of the meter bar with the right-hand end in partial section.

FIG. 3 is a bottom view of the meter bar of FIG. 2.

FIG. 4 is a left-hand end view.

While the invention has been described in connection with a preferred embodiment, it will be understood that I do not intend to be limited to the particular embodiment shown but intend, on the contrary, to cover the various alternative and equivalent forms of the invention which may be included within the spirit and scope of the appended claims.

Turning now to the drawing there is disclosed in FIG. 1 a typical set-up including a gas meter 10 having a pair of horizontally spaced upwardly projecting nipples 11, 12. The meter is connected between an inlet 13 and an outlet line 14. The inlet line normally includes a pressure reducing and regulating valve which is fed from a relatively high pressure gas line while the outlet line 14 leads to the usual gas distribution system within a home or other establishment.

In accordance with the present invention a meter bar 20 is provided made up of an elongated plate of metal bent into U-configuration having a vertical mounting portion and vertical forwardly extending end portions, the end portions being provided with alined openings which telescopingly receive the flanges of a pair of plumbers' elbows which extend mutually inwardly and downwardly for connection to the nipples of the meter. Thus, referring to the drawing, the meter bar 20 includes a mounting plate having a vertical mounting portion 21 and bent portions 22, 23 with alined circular openings 24, 25. The opening 24 serves to mount a plumbers' elbow 30 having a first or vertical flange 31 and a second or horizontal flange 32, both of the flange ends being internally threaded, as is customary, with a taper type thread. At the opposite end of the bar, fitted into opening 25, is a similar elbow 35 having a vertically oriented flange 36 and a horizontally oriented flange 37. The flanges 31, 36 are, as is shown, respectively telescoped into the openings, with the diameter of the openings being slightly greater than the diameter of the flanges so as to permit relative shifting movement in the plane of the end portions, in addition to relative telescoping movement along a horizontal axis A.

For the purpose of tailoring the assembly to the standard nipple spacing, an assembling jig J, indicated by the dot-dash outline, may be provided which mounts a pair of plugs $P_1$, $P_2$ which are tapered for snug fit into the threaded elbows and which are precisely spaced at the nipple spacing NS. The jig J preferably includes, as part of it, a support S which supports the mounting portion 21 of the plate in a position parallel to the axis of the plugs $P_1$, $P_2$. In use the elbows are seated securely upon the plugs as shown in FIG. 2, alined along the axis A and with the flanges 31, 36 loosely centered within the openings 24, 25. Tack welds W are then applied, which is all that is necessary to complete the assembly.

By appropriate choice of the length dimension L, the outer faces of the flanges 31, 36, when the elbows are on the plugs of the jig, will be substantially flush with the outer surfaces of the end portions 22, 23 of the plate. It is, however, one of the features of the present invention that the flanges need not be flush with the ends of the plate and that considerable axial variation is permissible, for example, up to ¼ inch or more at each elbow, thereby providing a wider range of accommodation than is possible using the strucutre disclosed in the prior application. Moreover, the openings 24, 25 are sufficiently large as to enable relative translational movement, both horizontally and vertically, as might be necessary to take care of any nonconcentricity between the openings 24, 25. For this purpose a radial clearance, between the flange and the opening, on the order of 1/32 inch, but in no event greater than about 1/16 inch, will suffice, the clearance further insuring that flanges having a range of diameter, or from different manufacturers, may be utilized.

The entire assembly operation including insertion of the elbows lightly into the mounting plate and the secure seating of the elbows upon the plugs of the jig, plus the tack welding, may all be accomplished, on a production line basis, within a matter of a few seconds. It is to be noted that in the present construction the welding heat is safely isolated from the plugs of the jig so that the plugs remain cool even under conditions of high production and may thus be formed of plastic such as nylon or the like without fear of overheating or deterioration.

A still further advantage of the construction described above is that even when the elbows are secured in place by welding at a nipple spacing NS, the ends 21, 22 of the mounting plate are susceptible to slight flexure inwardly and outwardly, so that if the spacing of the nipples departs from the nominal spacing in either direction accommodation will easily and automatically occur without any necessity for "forcing" as the nipples are screwed into the openings of the elbows. The mounting portion 21 is preferably rigidified by upsetting it with a longitudinally extending embossment 40, but, even so, the end portions of the mounting plate may be twisted through a limited angle so that the elbows may aline themselves with the nipples notwithstanding the fact that the nipples may not be oriented precisely parallel to one another.

The main advantage of the present meter bar construction is that the nipple-connecting ends of the elbows may be jig-spaced at a precise nipple spacing NS. The tapped openings in the elbows are already completed at the time that the elbows are jig-spaced from one another so that the dimension NS can be held to any desired degree of accuracy. This is to be contrasted with a cast meter bar in which the nipple openings cored in the casting are not on precise centers and in which the tap which makes the thread tends to follow the line of least resistance, centering itself with the opening, so that the finally tapped holes are susceptible to an inherent spacing error, requiring use of the offset swivels as previously mentioned.

However, it is one of the features of the present construction over that described in the preceding application that where the nipples themselves depart from the standard spacing there is sufficient flexibility of the end portions relative to the mounting portion so that a spacing error in either the plus or minus direction may be readily accommodated by flexure; indeed, the present meter bar is capable of accommodating nipples which have a misspacing on the order of 1/16 inch or more. Moreover, as stated, the torsional accommodation greatly exceeds that which is achieveable in the structure of the prior application to the extent that the nipples on the meter may depart from the parallel condition by several degrees without defeating the use of the bar. Thus a workman may take one of the present meter bars for installation on a remote job with assurance that there will be a perfect fit regardless of normal nipple error, with no need to provide offset swivels for purposes of "insurance".

Because of the "bends" 41, 42 (FIG. 3), which are preferably on a radius, the construction has a high degree of inherent strength and rigidity, permitting usage of relatively thin gauge metal resulting in a substantial saving over the earlier construction. A further economy is brought about by the fact that the present U-shaped units, upright and inverted, nest closely together for shipment.

The mounting portion is preferably provided with a central hole 43 for convenient mounting on any vertical surface. For example, the meter bar may be mounted by means of a bolt 44 upon a mounting post 45 where the meter is mounted outside of the building receiving service.

What I claim is:

1. A meter bar for mounting a gas meter having a pair of horizontally spaced upwardly projecting nipples comprising, in combination, a metal mounting plate of U-configuration having a vertical mounting portion and forwardly bent, vertically extending end portions, a pair of plumbers' elbows having flanges, alined openings in the end portions for receiving the flanges of respective elbows with the elbows extending mutually inwardly and downwardly and with the downwardly extending ends forming nipple connections, the openings being alined with one another and dimensioned for telescopic reception of the respective flanges, the elbows being tack welded in the openings with the nipple connections precisely spaced to register with the nipples.

2. The combination as claimed in claim 1 in which the length of the mounting plate is such that the flanges of the elbows are substantially flush with the outer surfaces of the end portions of the bar.

3. The combination as claimed in claim 1 in which the metal plate of which the bar is constructed is formed of metal which is sufficiently thin to provide for slight relative movement of the welded elbows and slight cocking thereof as may be required in accommodation of the bar to nipples which are not precisely spaced center-to-center or which are not perfectly parallel to one another, the mounting portion of the plate being rigidified by formation of a longitudinal embossment therein.

4. The combination as claimed in claim 1 in which the openings in the end portions of the bar are sufficiently greater in diameter than the flanges of the elbows so as to permit limited shifting movement of the elbows in the respective planes of the end portions as well as telescoping movement of the flanges in the respective openings to reference positions prior to welding in place.

* * * * *